United States Patent
Yntema

(10) Patent No.: US 9,070,409 B1
(45) Date of Patent: Jun. 30, 2015

(54) SYSTEM AND METHOD FOR VISUALLY REPRESENTING A RECORDED AUDIO MEETING

(71) Applicant: Nathan Robert Yntema, Cooper City, FL (US)

(72) Inventor: Nathan Robert Yntema, Cooper City, FL (US)

(*) Notice: Subject to any disclaimer, the term of this patent is extended or adjusted under 35 U.S.C. 154(b) by 0 days.

(21) Appl. No.: 14/451,051

(22) Filed: Aug. 4, 2014

(51) Int. Cl.
- G11B 20/10 (2006.01)
- H04H 60/04 (2008.01)
- G10L 21/10 (2013.01)

(52) U.S. Cl.
CPC ......... *G11B 20/10527* (2013.01); *H04H 60/04* (2013.01); *G10L 21/10* (2013.01); *G11B 2020/10546* (2013.01)

(58) Field of Classification Search
CPC ........................................................ H04N 7/147
USPC .......................................................... 704/201
See application file for complete search history.

(56) References Cited

U.S. PATENT DOCUMENTS

| | | | |
|---|---|---|---|
| 5,613,032 A * | 3/1997 | Cruz et al. ................. | 386/241 |
| 7,606,444 B1 | 10/2009 | Erol | |
| 8,316,089 B2 * | 11/2012 | Thakkar et al. ............. | 709/205 |
| 8,520,052 B2 * | 8/2013 | Venolia et al. .............. | 348/14.1 |
| 8,744,087 B2 * | 6/2014 | Bodley et al. ............... | 381/10 |
| 2004/0107106 A1 | 6/2004 | Margaliot | |
| 2006/0282774 A1 | 12/2006 | Covell | |
| 2008/0320082 A1 | 12/2008 | Kuhlke | |
| 2009/0210789 A1 | 8/2009 | Thakkar | |
| 2009/0228799 A1 | 9/2009 | Verbeeck | |
| 2009/0300514 A1 | 12/2009 | Jania | |
| 2009/0300520 A1 | 12/2009 | Ashutosh | |
| 2009/0327425 A1 | 12/2009 | Gudipaty | |
| 2011/0107236 A1 | 5/2011 | Sambhar | |
| 2011/0271208 A1 | 11/2011 | Jones | |
| 2012/0002001 A1 | 1/2012 | Prentice | |
| 2012/0005599 A1 | 1/2012 | Bastide | |
| 2012/0323575 A1 | 12/2012 | Gibbon | |
| 2013/0113804 A1 | 5/2013 | Ferman | |
| 2014/0040369 A1 | 2/2014 | Jones | |
| 2014/0046665 A1 | 2/2014 | Aoki | |

* cited by examiner

*Primary Examiner* — Susan McFadden
(74) *Attorney, Agent, or Firm* — The Keys Law Firm PLLC

(57) ABSTRACT

A system and method of visually representing a recorded audio meeting comprises a plurality of discrete microphones, each connected to an audio speaker as well as to a conventional digital mixing console, and a computer system connected to the digital mixing console. Captured audio is transmitted as audio signals to the audio speaker for broadcasting and to the mixing console where they are converted to a digital audio feed for transmission to the computer system. The computer system, which has associated a visual cue with audio signals based on their source, processes the digital audio feed signal to identify the sources of the captured audio therein and generates a visual cue associated with the identified audio source. This activity is represented in a composite visual representation that displays and records all session participants and indicates speaking participants in real time.

21 Claims, 7 Drawing Sheets

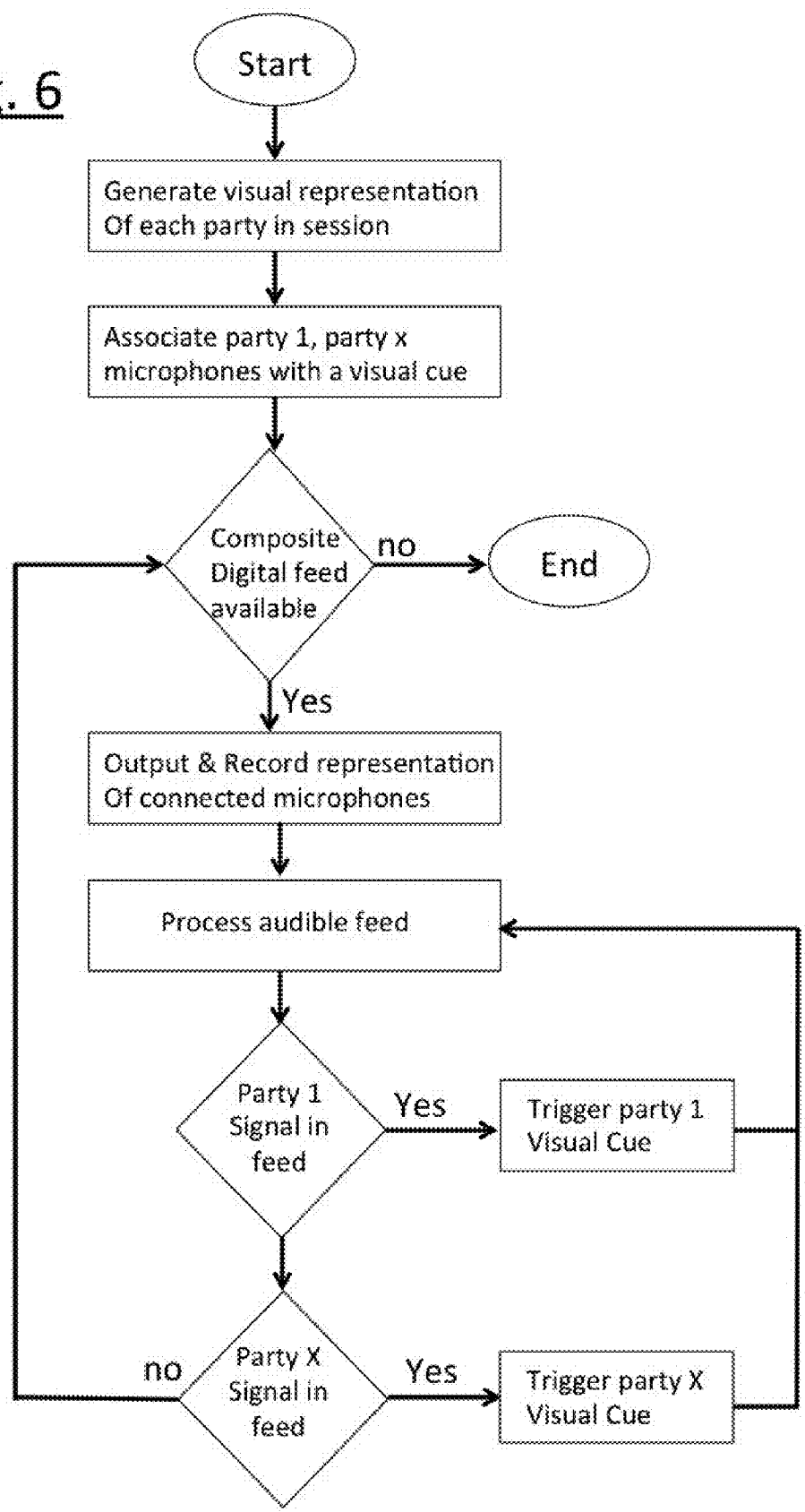

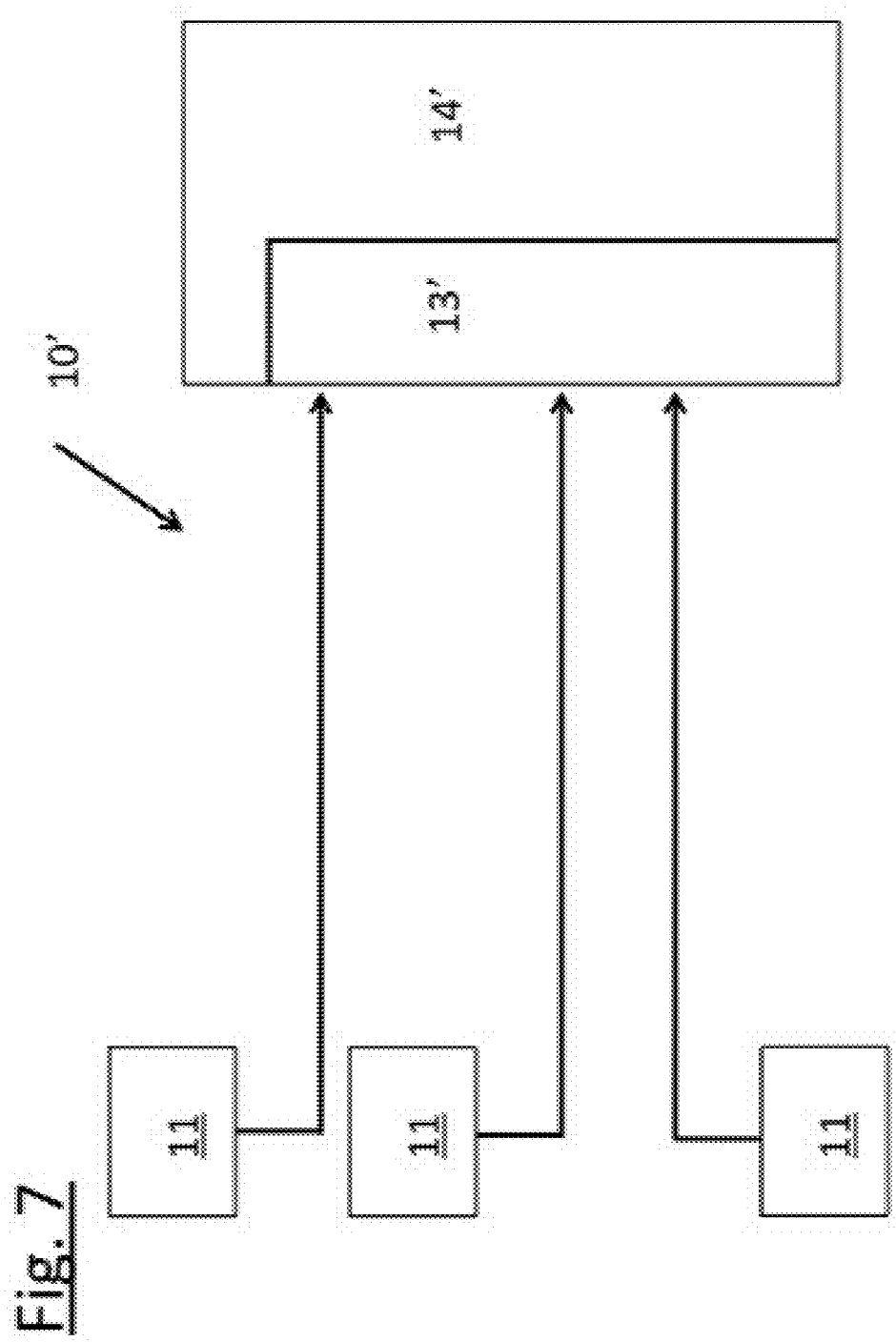

SYSTEM AND METHOD FOR VISUALLY REPRESENTING A RECORDED AUDIO MEETING

BACKGROUND OF THE INVENTION

1. Field of the Invention

This invention relates generally to audio recording and playback systems and methods and, more particularly, to a system and method for associating distinct a visual representation with discrete participants in a recorded meeting, enabling participants to be identified and distinguished when speaking by way of the visual representations.

2. Description of the Prior Art

The use and operation of conventional audio recording devices and mediums, including analog and digital recorders, to record and playback sounds is well established. When used alone, namely without video recording equipment, conventional audio recording devices are operative to record sounds present in a desired area or location, such as articulated voices, and fix them to a storage medium and/or distribute them over a transitory medium. The recorded material can then be utilized to playback the sound activity recorded at a desired time.

In many scenarios, including business meetings or other group discussions, the functionality of conventional audio recording devices and integrated or compatible audio playback devices is particularly useful in recording conversations occurring between a plurality of speakers. Advantageously, by recording the conversation of the speakers in a meeting, anyone can subsequently review the discussions that transpired, not only enabling parties who were not able to attend the meeting to be quickly brought up to speed, but also enabling participants who were in attendance to refresh their recollection.

A well known limitation of conventional recording devices, however, is that when recording conversations occurring between a plurality of speakers, the particular speaker being recorded at a given time is generally not automatically documented. As such, automatic identification of the present speaker during subsequent playback (or transcription) is generally not supported. Existing systems and methods which enable some form of identification of distinct speakers during playback, beyond simple voice recognition, generally require the use of additional equipment, such as a video recorder, and/or additional personnel, such as a transcription professional. But when employed solely to enable subsequent identification of speakers in a recording, such existing systems and methods generally are undesirable as they will increase the costs and space requirements for the meeting. Moreover, adding a camera or additional personnel to the meeting room(s) may cause some participants to become more hesitant to speak up.

Thus, there remains a need for a system and method for visually representing each participant in a recorded meeting while that participant is speaking which would automatically distinguish each speaker in real time during recording. It would be helpful if such a system and method for visually representing speaking participants in a recorded meeting was operative to identify each participant with a distinct visual cue to be displayed/highlighted during playback while that participant was speaking. It would be additionally desirable for such a system and method for visually representing speaking participants in a recorded meeting solely utilized conventional audio devices to minimize any increase in requisite space or implementation cost as well as any disruption to the typical meeting environment that may affect the participants' willingness to actively contribute thereto.

The Applicant's invention described herein provides for a system and method adapted to enable each speaking participant in a meeting to be associated with a distinct visual cue so as to allow such participants, during playback, to be identified and visually distinguished while speaking. The primary operational steps of Applicant's system and method for visually representing speaking participants are associating each of a plurality of distinct audio capture devices for use in a meeting with a particular sensory cue, analyzing sound level meters in received audio input to recognize participants in real time through their speaking, and generating a trigger tied to the sound recording which activates the sensory cue associated with the recognized participant while they speak. When in operation, the system and method for visually representing speaking participants allows users to know exactly who is speaking at any point during a recorded meeting. As a result, many of the limitations imposed by the fixed length structure of extension bars are removed.

SUMMARY OF THE INVENTION

A system and method for visually representing an audio meeting recording that captures audible sounds from a plurality of discrete sources, generated during a defined time frame, and produces a recordable sensory representation which, in addition to having the sound, identifies each specific discrete source of sound in the captured audio sound throughout the defined time frame. The system and method for visually representing an audio meeting recording comprises a plurality of discrete microphones, each connected to an audio speaker as well as to a conventional digital mixing console, and a computer system connected to the digital mixing console.

When in use, the microphones each capture sounds in their immediate vicinity, particularly the articulate voice of a session participant, and generate analog electrical audio signals therefrom. These audio signals are transmitted to the audio speaker for broadcasting and to the mixing console where they are converted to a digital audio feed signal. The digital audio feed signal is then transmitted to the computer system. The computer system, which has associated a visual cue with audio signals based on their source, processes the digital audio feed signal to identify the sources of the captured audio therein and generates a visual cue associated with the identified audio source. This activity is represented in a composite visual representation that displays all session participants and indicates speaking participants in real time. The composite visual representation showing the speaking activity during the session is additionally recorded to facilitate subsequent playback that includes not only recorded audio but a visual indication of the speaker at each given moment.

It is an object of this invention to provide a system and method for visually representing each participant in a recorded meeting while that participant is speaking which would automatically distinguish each speaker in real time during recording.

It is another object of this invention to provide a system and method for visually representing speaking participants in a recorded meeting that is operative to identify each participant with a distinct visual cue to be displayed/highlighted during playback while that participant was speaking.

It is yet another object of this invention to provide a system and method for visually representing speaking participants in a recorded meeting that solely utilizes conventional audio devices to minimize any increase in requisite space or implementation cost as well as any disruption to the typical meeting environment that may affect the participants' willingness to actively contribute thereto.

These and other objects will be apparent to one of skill in the art.

BRIEF DESCRIPTION OF THE DRAWINGS

FIG. 6 shows the process through which a visual representation is generated and recorded from a digital audio feed signal in a system and method for visually representing an audio meeting recording in accordance with the preferred embodiment of the present invention.

FIG. 7 is a block diagram showing electrical signal flow of a system and method for visually representing an audio meeting recording in accordance with an alternate embodiment of the present invention.

DETAILED DESCRIPTION OF THE INVENTION

Figure 1:
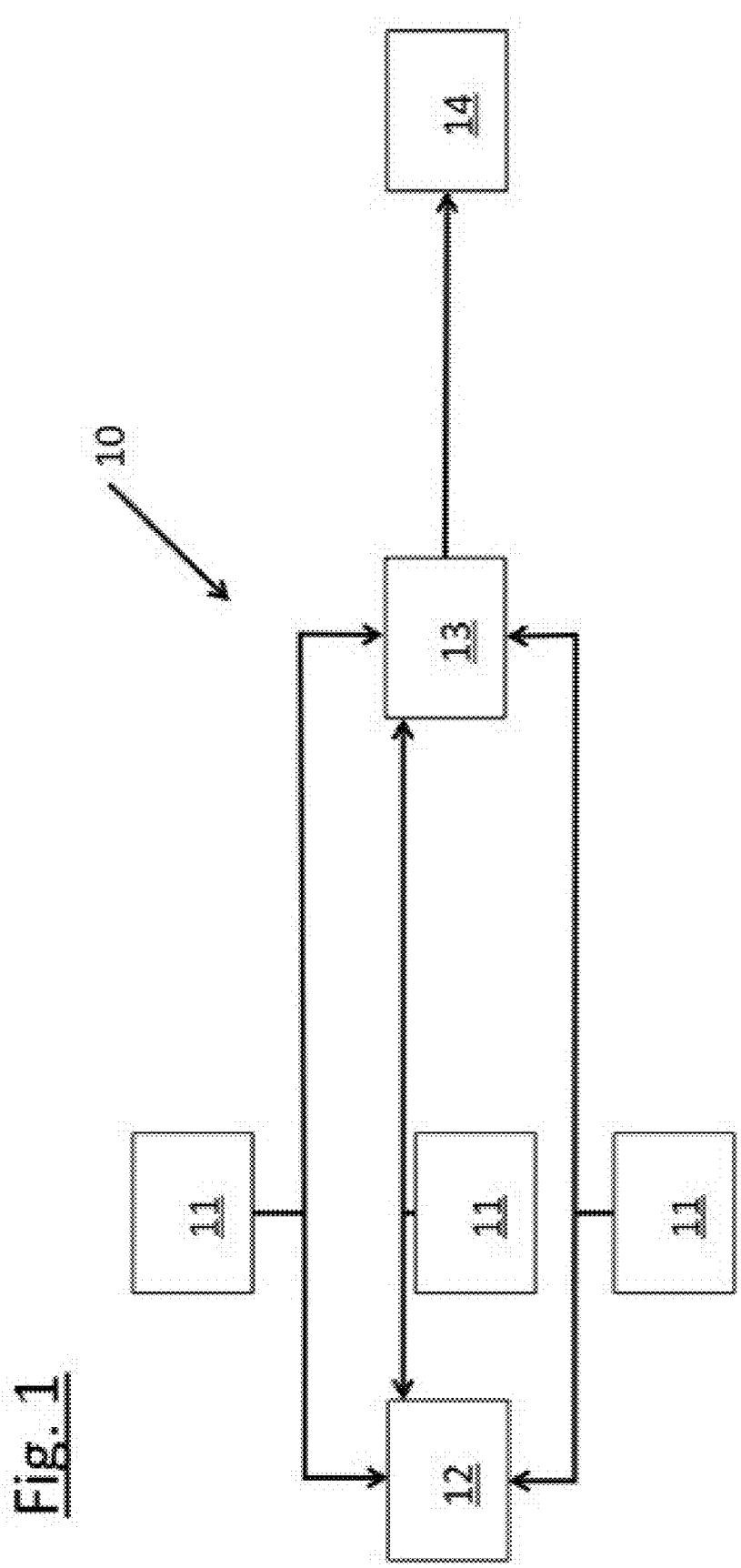
FIG. 1 is a block diagram showing electrical signal flow of a system and method for visually representing an audio meeting recording in accordance with the preferred embodiment of the present invention.

Referring now to the drawings and in particular FIG. 1, a system and method for visually representing an audio meeting recording 10 employs, in the preferred embodiment, a plurality of discrete microphones 11 which are each connected to an audio speaker 12, as well as to a conventional digital mixing console ("DMC") 13. Each microphone 11 captures sounds in its immediate vicinity, particularly the articulate voice of a user wearing it or sitting behind it. It is contemplated that when the system and method for visually representing an audio meeting recording 10 is used for recording meetings or conferences between a plurality of participants (or attendees), it is through the use of a plurality of microphones 11, with each assigned to an individual participant (or particular groups of participants), that each individual participant (or distinct group) is classified by the system based on the sound captured by the particular microphone 11 in his immediate vicinity.

As each of the microphones 11 generate analog electrical audio signals from the articulated voice of its respective participant, the audio signals are transmitted to the audio speaker 12 to enable them to be broadcast in a desired area and to the DMC 13 to be converted to a digital audio feed signal (or "digital feed"). The digital feed is then transmitted to a computer system 14 which includes a processor, non-volatile memory, and a visual display screen 30, with the non-volatile memory containing instructions embodied as a visual recognition software module 31 that enable the processor to associate audio signals with a visual cue based on their source, process a digital feed containing audio signals from a plurality of sources to identify the sources of each, and generate a visual cue associated with an identified audio source, as well as instructions embodied as screen recording software module 32 that enable the processor to record the visual output generated by the computer system 14 to non-volatile memory connected to the computer system 14.

It is contemplated that in alternate embodiments, other conventional audible sound capturing devices may be used in place of a microphone 11, other conventional audio output devices may be used in place of an audio speaker 12, other conventional analog to digital converting devices may be used in place of the DMC 13, and/or other conventional graphical user interfaces may be used in place of the visual display screen 30.

Figure 2:
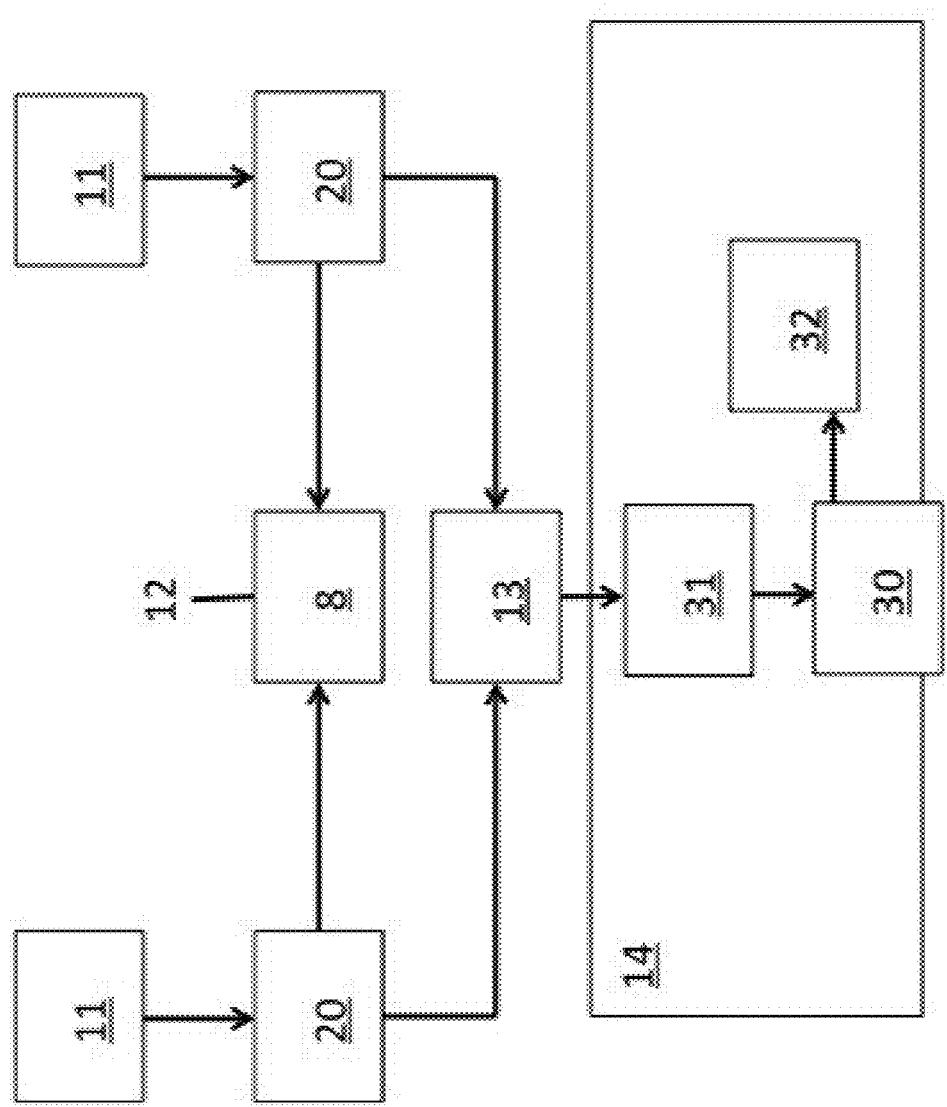
FIG. 2 is a block diagram showing the electrical signal flow through the operational components of a system and method for visually representing an audio meeting recording in accordance with the preferred embodiment of the present invention.

Referring now to FIGS. 1 and 2, in the preferred embodiment XLR one (1) to two (2) connectors 20 are connected to the microphones 11 and split the electrical audio signals generated by the microphones 11. Through this configuration, the electrical audio signals are able to be directed, in whole, to both the audio speaker 12 and the DMC 13. It is contemplated, however, that in alternate configurations wherein microphone captured audio is to be broadcast through the computer system 14 or is not desired to be broadcast in real time, a direct connection to the audio speaker 12 is not required. In such embodiments, an XLR one (1) to one (1) connector or another conventional audio electrical connector may be employed.

The DMC 13 converts each of the received various audio signals into a digital signal and generates a digital feed signal containing the digital signals for transmittal to the computer system 14 through a serial bus. Depending on the type of computer system 14 used, a Firewire 400 to 800 connector with a Thunderbolt to Firewire 800 adaptor or a Universal Serial Bus ("USB") connector may be employed to form a bus for connection and communication between the DMC 13 and the computer system 14.

Figure 3:
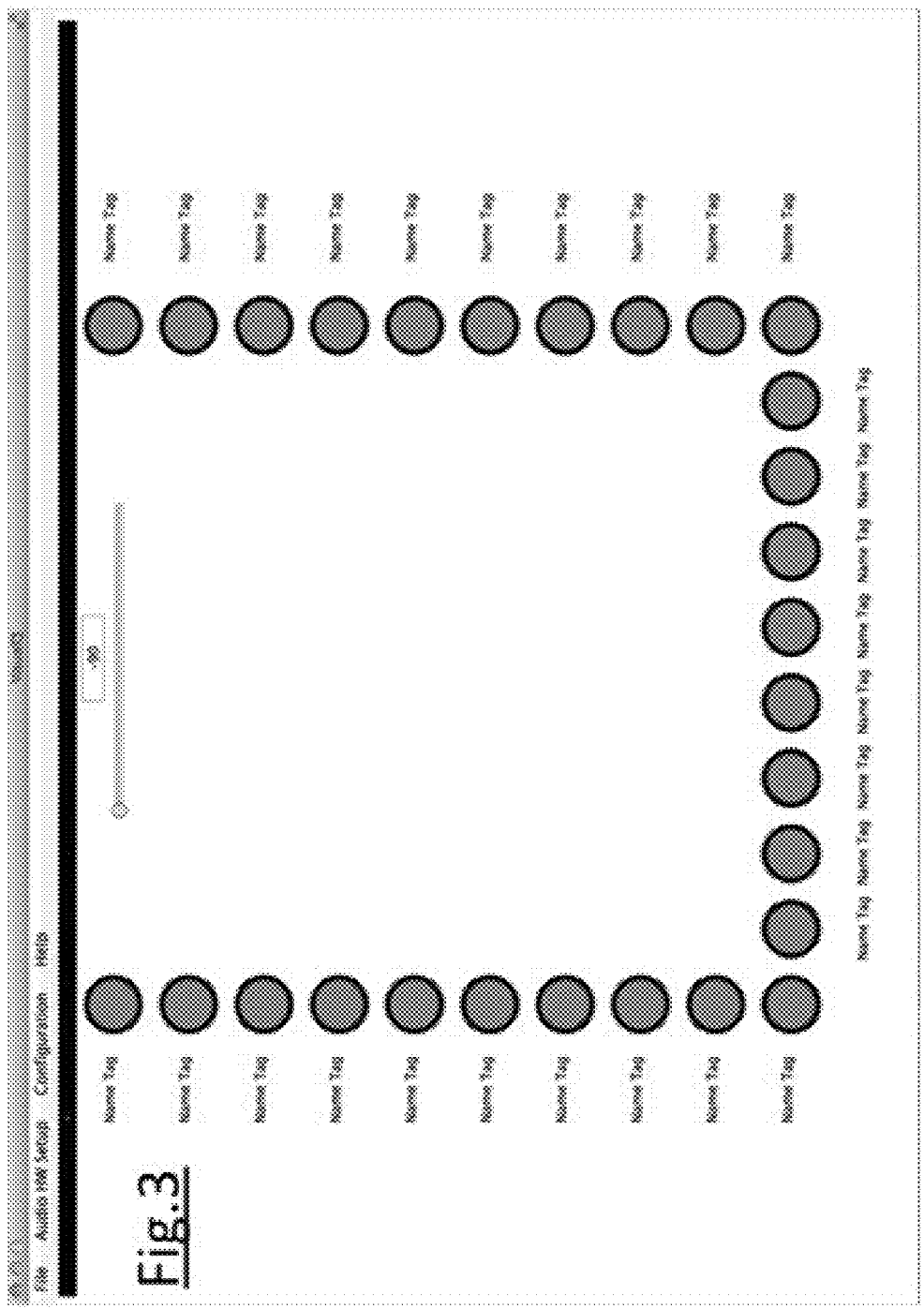
FIG. 3 shows a screen shot of an exemplary visual representation generated by a system and method for visually representing an audio meeting recording in accordance with the present invention having 28 participants.
Figure 4:
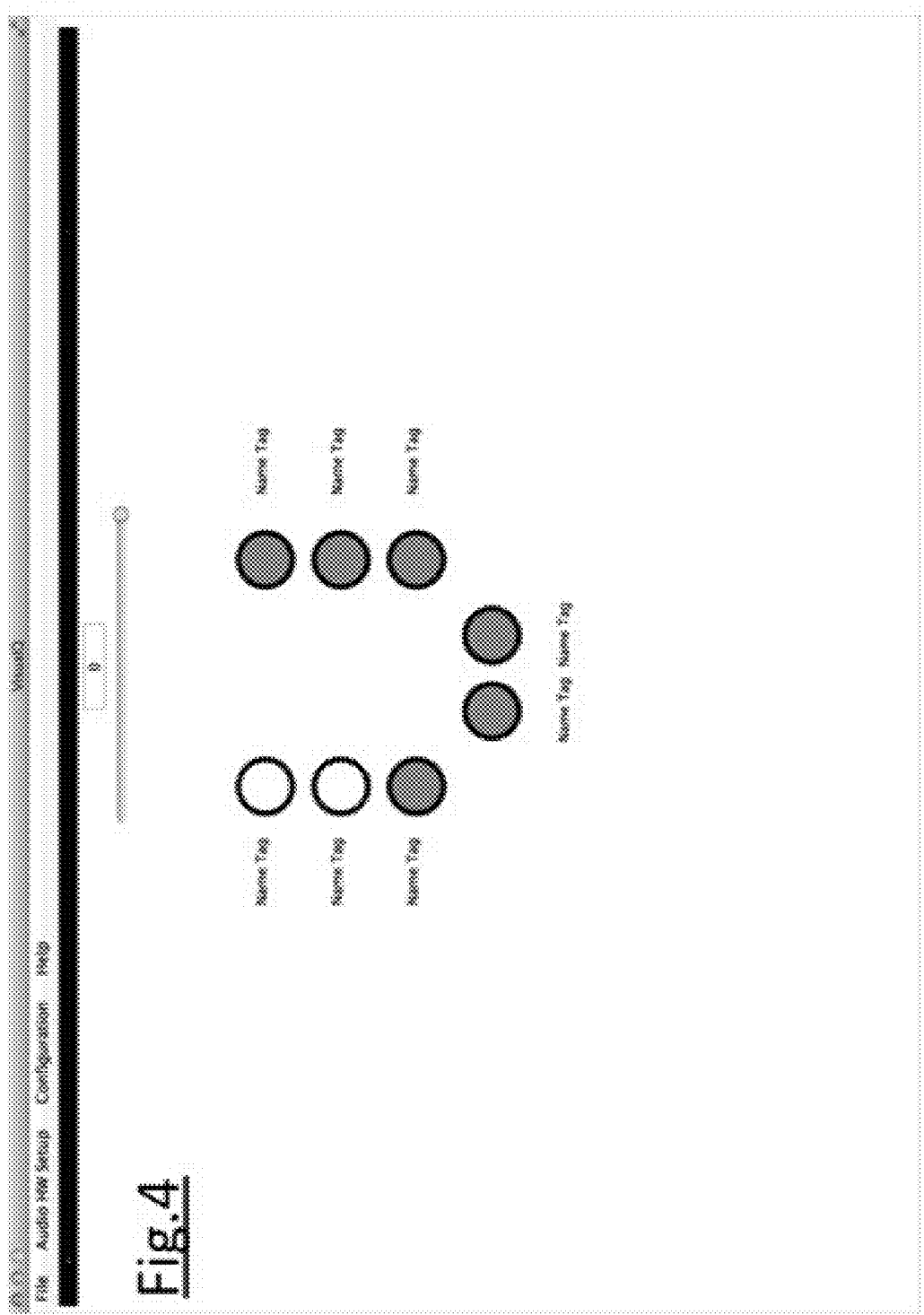
FIG. 4 shows a screen shot of an exemplary visual representation generated by a system and method for visually representing an audio meeting recording in accordance with the present invention having 8 participants.

The digital feed is processed by the computer system 14 through the visual recognition software module 31. As the digital feed is processed by the visual recognition software module 31, the computer system 14 displays a visual representation of all participants by microphone 11, with a visual cue indicating the particular speaker at each given moment on the visual display screen 30, and records the visual and audio output generated through the screen recording software module 32. It is contemplated that the recording created by the screen recording software module 32 will produce a software file that, when played back on any computing device having the capability to read audio and visual media storage files and provide a audible and visual output (including without limitation the computer system 14), provides an audio output of the sound collected from each microphone 11 and a visual output that displays an icon for each participant in the audio recording session and produces a visual indication associated with a participant's icon when that respective participant is producing sound (generally from talking). Exemplary visual outputs are shown in FIGS. 3-4.

Figure 5:
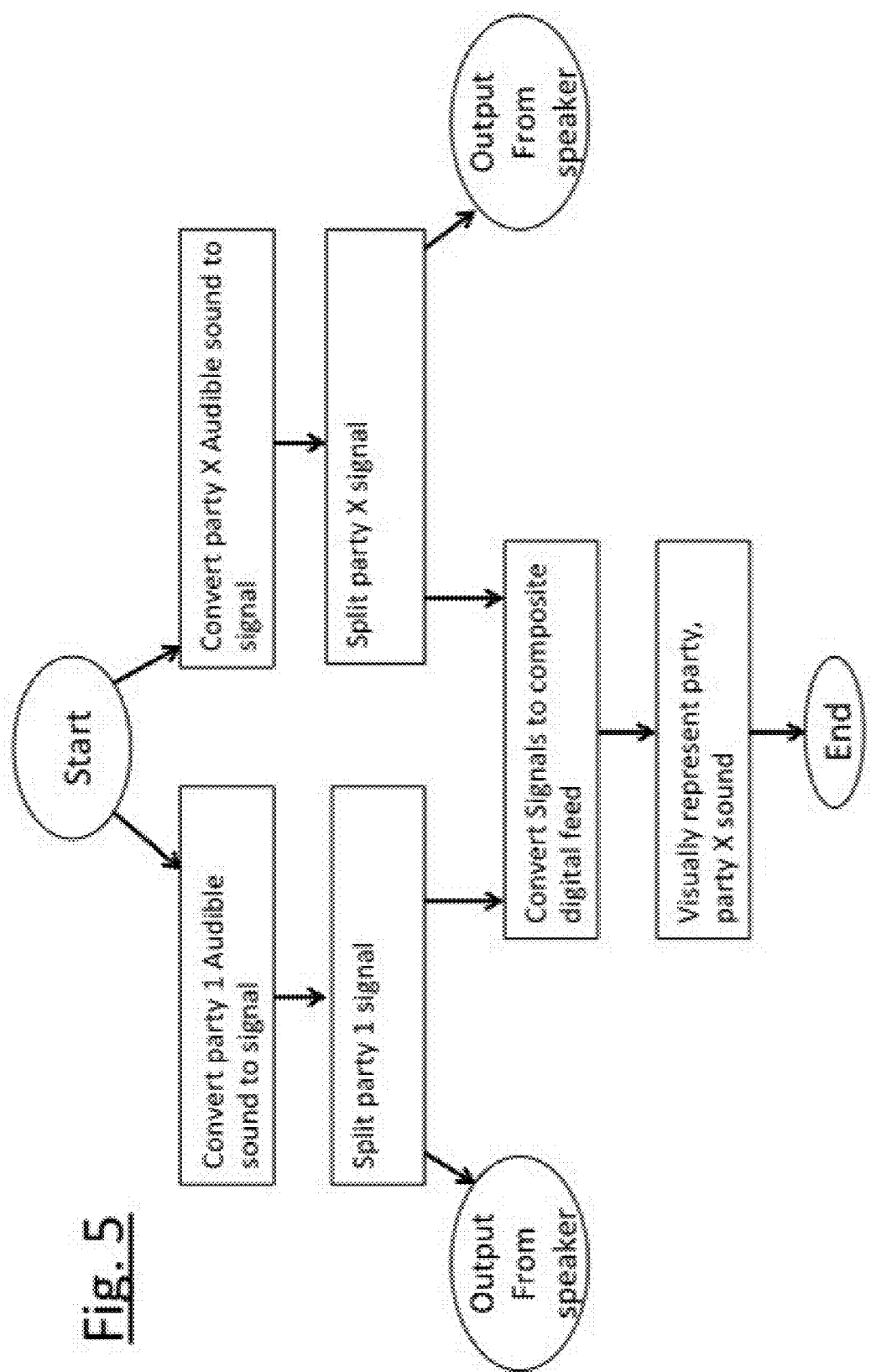
FIG. 5 shows the process through which a digital audio feed signal is generate for use in a system and method for visually representing an audio meeting recording in accordance with the preferred embodiment of the present invention.

Referring now to FIG. 5, the audio collection process for a system for visually representing an audio meeting recording begins with the conversions of sound from a plurality of participants (or parties) into electrical audio signals by a microphone. In the preferred embodiment, each of the electrical audio signals generated by the microphone is then split, with the split signal to be delivered to an audio speaker to be broadcast as well as to a DMC. It is contemplated that in embodiments wherein it is not desired to broadcast the audio captured by one or more of the microphones in use, the audio signal from the microphone is to be transmitted solely to the DMC.

The DMC converts the plurality of audio signals received into a digital feed for transmission to a computer system, where the digital feed is processed to generate an output that visually represents each party and, by their microphone, identifies the party speaking at each given moment.

Referring now to FIG. 6, the process by which a visual representation is generated and recorded from a digital audio feed signal by a system for visually representing an audio meeting recording begins with generating a composite visual representation containing an icon or other representation of each party, by microphone, in the session to be visually represented and/or recorded (such as a meeting, conference, or other group conversation). As such, each visual representation corresponds to a specific source microphone connected to the computer system. As seen in FIGS. 3-4, such a visual representation provides a baseline view of the number of parties participating or otherwise having a microphone associated with them.

It is contemplated that in some implementations, a single party (judged by microphone), may actually represent a plurality of people, such as a single department or group in an organization, that is sharing a single microphone.

In addition, with each party having a specific visual representation which corresponds to them, it is contemplated that for ease of reference, specific names can be assigned to the visual representations. It is contemplated that for some implementations, Powerpoint (or other presentation software program) is utilized to generate the composite visual representation of each party.

Next, each party's microphone is associated with a visual cue through the visual recognition software module. The visual cue, when triggered, activates their respective specific corresponding icon in the composite visual representation. Accordingly, during the session, whenever a signal which originated at a particular party's microphone is received by the computer system in the digital feed, the visual recognition software module triggers the visual cue associated with that microphone to distinguish that respective visual representation for as long as the signal in the digital feed indicates audio is being captured from that microphone. In the preferred embodiment, the visual representation is activated by either flashing (when the others are solid or blank), becoming solid (when the others are flashing or blank), or changing colors. In alternate embodiments, any conventional visual output technique for distinguishing a particular character, image or icon may be employed.

The visual representation and/or recording session actually commences when a digital feed becomes available to the computer system. Once the digital feed from the DMC becomes available, the visual recognition software module begins outputting the composite visual representation of the session and processing the digital feed(s) availed to it. At the same time, the screen recording software module begins recording the audio and visual output of the computer system. In one embodiment, Quicktime X is utilized as the screen recording software module.

During the processing of the digital feed, the computer system, through the visual recognition software module, continually initiates a series of queries to identify, at a given time, the source microphone of any captured audio in the digital feed. Accordingly, if the computer system detects captured audio from a first microphone connected in the session, it triggers the visual cue associated with that microphone, thereby causing the activating the visual representation of the party identified by the first microphone. Similarly, if the computer system detects captured audio from a second microphone connected in the session, it triggers the visual cue associated with that microphone, thereby causing the activating the visual representation of the party identified by the second microphone. Such a query is repeated for each microphone connected in the session, enabling the real time activation of the visual representation of the speaking party at all times during the session.

When no captured audio from a connected microphone is detected, the computer system, through the visual recognition software module, again confirms the availability of digital feed. If the digital feed remains available, the computer continues to run its series of queries. Once it is detected that the digital feed is unavailable, the computer system terminates the visual representation and/or recording session.

In sessions wherein all participants are in the same room, it is understood that a single DMC may provide the sole digital feed. It is appreciated, however, that meeting sessions wherein some or all participants are in different rooms (buildings, cities, countries) from one another, wherein a plurality of digital feeds, each containing signals corresponding to a microphone or a plurality of microphones are received. In sessions having participants in a plurality of different rooms, a plurality of the rooms containing participants include a computer system running the visual recognition software module and connected to a microphone by way of a DMC. In this arrangement, the visual recognition software modules on each computer system allows the computer systems to log into the same visual representation session, forming a connection over the computer network, and synchronize with each other through real time transmissions that enable the complete visual representation of all participants to be displayed simultaneously through each computer system. In this regard, the computer systems each directly receive all digital signals from the microphones in their associated room, if any, and transmit data relating to those signals to each other computer system that is a part of the same visual representation session. The computer systems may send data embodied as the raw digital signal from the microphones or data processed by the visual recognition software module that includes the audio compressed and the generated visual cue. Each computer system receives this data, generates the visual representation, and if desired, records the session In an alternate embodiment for sessions having participants in a plurality of different rooms, the system and method for visually representing an audio meeting recording operates through a host computer system on which the visual recognition software module is running. The host computer system would receive over a computer network, such as the Internet, signals from each remote microphone either directly, through a DMC, or through a client computer system running the visual recognition software module. The host computer system processes the signals as if all microphones are in the same room and distributes to each other computer system in the session an output that enables the complete visual representation of all participants to be displayed simultaneously on each computer system.

In embodiments wherein the participants are in different rooms, any computer system generating or receiving a visual representation output in accordance with the present invention can record the audio and video as discussed above through a screen recording software module.

Referring now to FIG. 7, in an alternate embodiment of the system and method for visually representing an audio meeting recording 10' employs a plurality of discrete microphones 11' which are each connected to a computer system 14' containing hardware and software that enables it to additionally function as a DMC 13'.

It is contemplated that in addition to the visual representation of the participants in a meeting session, the visual recognition software module may also link to or integrate in its output display presentation materials, such as presentation files or word processing files.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for visually representing an audio meeting session having a plurality of participants, comprising:
    a plurality of microphones, wherein each of said plurality of microphones are configured to generate audio signals from sound made by at least one session participant in its the vicinity of the respective microphone; and
    at least one computer system having a processor and non-volatile memory and communicatively connected to said plurality of microphones, wherein said computer system is configured to identify each connected microphone as a discrete source of audio signals from the at least one session participant in its vicinity, associate audio signals from each connected microphone with a distinct visual cue, trigger the respective visual cue of at least one of said microphones upon the receipt of an electrical transmission containing audio signals generated by the source microphone, thereby indicating the capture of sound from at least one session participant in the vicinity of the respective microphone, and generate a visual output useable by a graphical user interface, wherein said visual output is defined by a composite visual representation which includes a visual representation of at least one of said plurality microphones.

2. The system for visually representing an audio meeting session of claim 1, wherein the composite visual representation includes a visual representation of each of said plurality microphones.

3. The system for visually representing an audio meeting session of claim 1, wherein triggering the visual cue associated with at least one of said microphones causes the visual representation of that microphone to activate in the composite visual representation.

4. The system for visually representing an audio meeting session of claim 3, wherein said computer system is additionally configured to perform at least one of recording the visual output generated to a non-volatile memory communicatively associated therewith and displaying the visual output on a graphic user interface.

5. The system for visually representing an audio meeting session of claim 1, wherein said plurality of microphones are connected to said computer system through at least one analog to digital converter configured to generate at least one digital electrical transmission containing audio signals from the plurality of discrete microphones from which the respective microphone generating audio signals at a given moment can be identified.

6. The system for visually representing an audio meeting session of claim 5, wherein said analog to digital converter is defined as a digital mixing console.

7. The system for visually representing an audio meeting session of claim 5, wherein said analog to digital converter is embodied in a discrete housing.

8. The system for visually representing an audio meeting session of claim 5, wherein one analog to digital converter is operative to convert audio signals generated by said plurality of microphones into one digital electrical transmission.

9. The system for visually representing an audio meeting session of claim 5, wherein a plurality of analog to digital converters are operative to convert audio signals generated by said plurality of microphones into a plurality of digital electronic transmissions.

10. The system for visually representing an audio meeting session of claim 1, additionally comprising at least one audio output device, wherein said audio signals output by at least one of said plurality of microphones is directed to said at least one audio output device in addition to said computer system.

11. A system for visually representing an audio meeting session having a plurality of participants, comprising:
    a plurality of microphones, wherein each of said plurality of microphones are configured to generate audio signals from sound made by at least one session participant in its the vicinity of the respective microphone;
    at least one computer system having a processor and non-volatile memory and communicatively connected to said plurality of microphones through at least one digital mixing console, wherein said at least one digital mixing console is operative to convert audio signals generated by said plurality of microphones to at least one digital electrical transmission from which the respective microphone generating audio signals at a given moment can be identified;
    wherein said computer system is configured to identify each connected microphone as a discrete source of audio signals from the at least one session participant in its vicinity, associate audio signals from each connected microphone with a distinct visual cue, trigger the respective visual cue of at least one of said microphones upon the receipt of an electrical transmission containing audio signals generated by the source microphone, thereby indicating the capture of sound from at least one session participant in the vicinity of the respective microphone, and generate a visual output defined by a composite visual representation which includes a visual representation of each of said plurality microphones communicatively connected thereto, and process the digital electrical transmission containing audio signals generated by said plurality of microphones;
    wherein triggering the visual cue associated with at least one of said microphones causes the visual representation of that microphone to activate in the composite visual representation;
    wherein said computer system is additionally configured to record the visual output generated to a non-volatile memory communicatively associated therewith; and
    at least one audio output device, wherein said audio signals output by at least one of said plurality of microphones is directed to said at least one audio output device in addition to said computer system.

12. The system for visually representing an audio meeting session of claim 11, wherein said analog to digital converter is embodied in a discrete housing.

13. The system for visually representing an audio meeting session of claim 11, wherein said at least one digital electrical transmissions is defined by a single digital electronic transmission.

14. A method for visually representing an audio meeting session having a plurality of participants, comprising the steps of:

providing a plurality of microphones, each configured to generate audio signals from sound made by at least one session participant in the vicinity of the respective microphone, and at least one computer system having a processor and non-volatile memory and communicatively connected to said plurality of microphones;

identifying by said processor each connected microphone as a discrete source of audio signals from the at least one session participant in its vicinity;

associating by said processor audio signals from each connected microphone with a distinct visual cue;

processing by said processor an electrical transmission containing audio signals generated by said plurality of microphones, wherein the step of processing includes triggering the visual cue associated with the source microphone while that source microphone generates audio signals so as to indicate the capture of sound from at least one session participant in the vicinity of the respective microphone; and generating by said processor a visual output defined by a composite visual representation which includes a visual representation of at least one of said plurality microphones communicatively connected thereto.

15. The method for visually representing an audio meeting session of claim 14, wherein the composite visual representation includes a visual representation of each of said plurality microphones.

16. The method for visually representing an audio meeting session of claim 14, wherein triggering the visual cue associated with at least one particular source microphone causes the visual representation of that microphone to activate in the composite visual representation.

17. The method for visually representing an audio meeting session of claim 16, additionally comprising the step of displaying the visual output on a graphical user interface.

18. The method for visually representing an audio meeting session of claim 16, wherein said audio signals generated by said plurality of microphones are chronologically synchronized to the triggering of visual cues in the recording of the visual output.

19. The method for visually representing an audio meeting session of claim 14, wherein said plurality of microphones are connected to said computer system through a single digital mixing console configured to generate one digital electrical transmission containing audio signals from the plurality of discrete microphones from which the respective microphone generating audio signals at a given moment can be identified.

20. The method for visually representing an audio meeting session of claim 14, wherein said plurality of microphones are connected to said computer system through a plurality of digital mixing consoles configured to generate a plurality of digital electrical transmissions containing audio signals from the plurality of discrete microphones from which the respective microphone generating audio signals at a given moment can be identified.

21. The method for visually representing an audio meeting session of claim 15, additionally comprising the step of recording the visual output generated to a non-volatile memory communicatively associated therewith.

\* \* \* \* \*